(12) United States Patent
Gass et al.

(10) Patent No.: US 7,377,199 B2
(45) Date of Patent: May 27, 2008

(54) CONTACT DETECTION SYSTEM FOR POWER EQUIPMENT

(75) Inventors: Stephen F. Gass, Wilsonville, OR (US); J. David Fulmer, Tualatin, OR (US)

(73) Assignee: SD3, LLC, Tualatin, OR (US)

( * ) Notice: Subject to any disclaimer, the term of this patent is extended or adjusted under 35 U.S.C. 154(b) by 1038 days.

(21) Appl. No.: 10/053,390

(22) Filed: Jan. 16, 2002

(65) Prior Publication Data

US 2002/0069734 A1 Jun. 13, 2002

Related U.S. Application Data

(63) Continuation-in-part of application No. 09/929,221, filed on Aug. 13, 2001, and a continuation-in-part of application No. 09/929,226, filed on Aug. 13, 2001, and a continuation-in-part of application No. 09/929,227, filed on Aug. 13, 2001, and a continuation-in-part of application No. 09/929,234, filed on Aug. 13, 2001, and a continuation-in-part of application No. 09/929,235, filed on Aug. 13, 2001, and a continuation-in-part of application No. 09/929,236, filed on Aug. 13, 2001, and a continuation-in-part of application No. 09/929,237, filed on Aug. 13, 2001, and a continuation-in-part of application No. 09/929,238, filed on Aug. 13, 2001, and a continuation-in-part of application No. 09/929,240, filed on Aug. 13, 2001, and a continuation-in-part of application No. 09/929,241, filed on Aug. 13, 2001, and a continuation-in-part of application No. 09/929,242, filed on Aug. 13, 2001, and a continuation-in-part of application No. 09/929,244, filed on Aug. 13, 2001, and a continuation-in-part of application No. 09/929,425, filed on Aug. 13, 2001, and a continuation-in-part of application No. 09/929,426, filed on Aug. 13, 2001, and a continuation-in-part of application No. 09/676,190, filed on Sep. 29, 2000.

(60) Provisional application No. 60/270,011, filed on Feb. 20, 2001.

(51) Int. Cl.
*B26D 5/00* (2006.01)
*B27B 5/18* (2006.01)

(52) U.S. Cl. .......................... 83/13; 83/62.1; 83/471.2; 83/477.2; 83/490; 83/DIG. 1; 83/581; 83/397.1

(58) Field of Classification Search ................ 324/678, 324/658, 686, 660, 775, 706, 725; 83/62.1, 83/DIG. 31, 397, 477.1, 471.3, 630, 58, 297, 83/644, 13, DIG. 1, 397.1, 471.2, 477.2, 83/490, 581; 317/146, DIG. 2, 153, 123
See application file for complete search history.

(56) References Cited

U.S. PATENT DOCUMENTS 941,726 A 11/1909 Pfalzgraf (Continued)

FOREIGN PATENT DOCUMENTS

CH 297525 6/1954

(Continued)

OTHER PUBLICATIONS

Gordon Engineering Corp., Product Catalog, Oct. 1997, pp. cover, 1, 3 and back, Brookfield, Connecticut, US.

*Primary Examiner*—Ghassem Alie

(57) ABSTRACT

A woodworking machine having one or more dangerous portions of the machine is disclosed. The machine also includes a safety system configured to detect accidental contact between a person and at least one of the dangerous portions by electrically coupling a signal to the person's body, and detecting if the signal becomes coupled to the dangerous portion.

17 Claims, 8 Drawing Sheets

U.S. PATENT DOCUMENTS

| | | |
|---|---|---|
| 1,205,246 A | 11/1916 | Mowry |
| 1,551,900 A | 9/1925 | Morrow |
| 1,582,483 A | 4/1926 | Runyan |
| 1,807,120 A | 5/1931 | Lewis |
| 1,811,066 A | 6/1931 | Tannewitz |
| 1,896,924 A | 2/1933 | Ulrich |
| 1,902,270 A | 3/1933 | Tate |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 2,007,887 A | 7/1935 | Tautz |
| 2,020,222 A | 11/1935 | Tautz |
| 2,038,810 A | 4/1936 | Tautz |
| 2,106,288 A | 1/1938 | Tautz |
| 2,163,320 A | 6/1939 | Hammond |
| 2,241,556 A | 5/1941 | MacMillin et al. |
| 2,286,589 A | 6/1942 | Tannewitz |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,425,331 A | 8/1947 | Kramer |
| 2,434,174 A | 1/1948 | Morgan |
| 2,466,325 A | 4/1949 | Ocenasek |
| 2,496,613 A | 2/1950 | Woodward |
| 2,509,813 A | 5/1950 | Dineen |
| 2,517,649 A | 8/1950 | Frechtmann |
| 2,554,124 A * | 5/1951 | Salmont .................. 331/40 |
| 2,562,396 A | 7/1951 | Schutz |
| 2,572,326 A | 10/1951 | Evans |
| 2,593,596 A | 4/1952 | Olson |
| 2,601,878 A | 7/1952 | Anderson |
| 2,623,555 A | 12/1952 | Eschenburg |
| 2,661,780 A | 12/1953 | Morgan |
| 2,675,707 A | 4/1954 | Brown |
| 2,690,084 A | 9/1954 | Van Dam |
| 2,722,246 A | 11/1955 | Arnoldy |
| 2,731,049 A | 1/1956 | Akin |
| 2,736,348 A | 2/1956 | Nelson |
| 2,785,710 A | 3/1957 | Mowery, Jr. |
| 2,786,496 A | 3/1957 | Eschenburg |
| 2,954,118 A | 9/1960 | Anderson |
| 2,978,084 A | 4/1961 | Vilkaitis |
| 2,984,268 A | 5/1961 | Vuichard |
| 2,991,593 A | 7/1961 | Cohen |
| 3,011,610 A | 12/1961 | Stiebel et al. |
| 3,047,116 A | 7/1962 | Stiebel et al. |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,224,474 A | 12/1965 | Bloom |
| 3,313,185 A | 4/1967 | Drake et al. |
| 3,323,814 A | 6/1967 | Phillips |
| 3,337,008 A | 8/1967 | Trachte |
| 3,386,322 A | 6/1968 | Stone et al. |
| 3,454,286 A | 7/1969 | Anderson et al. |
| 3,540,338 A | 11/1970 | McEwan et al. |
| 3,554,067 A | 1/1971 | Scutella |
| 3,566,996 A | 3/1971 | Crossman |
| 3,581,784 A | 6/1971 | Warrick |
| 3,613,748 A | 10/1971 | De Pue |
| 3,675,444 A | 7/1972 | Whipple |
| 3,680,609 A | 8/1972 | Menge |
| 3,688,815 A | 9/1972 | Ridenour |
| 3,695,116 A | 10/1972 | Baur |
| 3,696,844 A | 10/1972 | Bernatschek |
| 3,745,546 A | 7/1973 | Struger et al. |
| 3,749,933 A | 7/1973 | Davidson |
| 3,772,590 A | 11/1973 | Mikulecky et al. |
| 3,785,230 A | 1/1974 | Lokey |
| 3,829,850 A * | 8/1974 | Guetersloh .................. 340/515 |
| 3,858,095 A * | 12/1974 | Friemann et al. ....... 192/129 A |
| 3,861,016 A | 1/1975 | Johnson et al. |
| 3,882,744 A | 5/1975 | McCarroll |
| 3,922,785 A | 12/1975 | Fushiya |
| 3,924,688 A | 12/1975 | Cooper et al. |
| 3,931,727 A | 1/1976 | Luenser |
| 3,935,777 A | 2/1976 | Bassett |
| 3,945,286 A | 3/1976 | Smith |
| 3,946,631 A | 3/1976 | Malm |
| 3,947,734 A | 3/1976 | Fyler |
| 3,953,770 A * | 4/1976 | Hayashi .................. 361/179 |
| 3,967,161 A | 6/1976 | Lichtblau |
| 3,994,192 A | 11/1976 | Faig |
| 4,007,679 A | 2/1977 | Edwards |
| 4,026,177 A | 5/1977 | Lokey |
| 4,029,159 A | 6/1977 | Nymann |
| 4,047,156 A | 9/1977 | Atkins |
| 4,048,886 A * | 9/1977 | Zettler .................. 83/58 |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,106,378 A | 8/1978 | Kaiser |
| 4,117,752 A | 10/1978 | Yoneda |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,190,000 A | 2/1980 | Shaull et al. |
| 4,195,722 A | 4/1980 | Anderson et al. |
| 4,199,930 A | 4/1980 | Lebet et al. |
| 4,249,117 A | 2/1981 | Leukhardt et al. |
| 4,249,442 A | 2/1981 | Fittery |
| 4,267,914 A | 5/1981 | Saar |
| 4,270,427 A | 6/1981 | Colberg et al. |
| 4,276,799 A | 7/1981 | Muehling |
| 4,291,794 A | 9/1981 | Bauer |
| 4,305,442 A | 12/1981 | Currie |
| 4,321,841 A | 3/1982 | Felix |
| 4,372,202 A | 2/1983 | Cameron |
| 4,391,358 A | 7/1983 | Haeger |
| 4,466,233 A | 8/1984 | Thesman |
| 4,470,046 A | 9/1984 | Betsill |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,560,033 A | 12/1985 | DeWoody et al. |
| 4,566,512 A | 1/1986 | Wilson |
| 4,573,556 A | 3/1986 | Andreasson |
| 4,589,047 A * | 5/1986 | Gaus et al. .................. 361/42 |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,621,300 A | 11/1986 | Summerer |
| 4,637,188 A | 1/1987 | Crothers |
| 4,637,289 A | 1/1987 | Ramsden |
| 4,657,428 A | 4/1987 | Wiley |
| 4,679,719 A | 7/1987 | Kramer |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,792,965 A | 12/1988 | Morgan |
| 4,805,504 A | 2/1989 | Fushiya et al. |

| | | | | | | |
|---|---|---|---|---|---|---|
| 4,831,279 A * | 5/1989 | Ingraham ............... 307/116 | 5,930,096 A | 7/1999 | Kim | |
| 4,840,135 A | 6/1989 | Yamauchi | 5,937,720 A | 8/1999 | Itzov | |
| 4,864,455 A | 9/1989 | Shimomura et al. | 5,942,975 A | 8/1999 | S.o slashed.rensen | |
| 4,896,607 A | 1/1990 | Hall et al. | 5,943,932 A | 8/1999 | Sbereveglieri | |
| 4,906,962 A | 3/1990 | Duimstra | 5,950,514 A | 9/1999 | Benedict et al. | |
| 4,934,233 A | 6/1990 | Brundage et al. | 5,963,173 A | 10/1999 | Lian et al. | |
| 4,936,876 A | 6/1990 | Reyes | 5,974,927 A | 11/1999 | Tsune | |
| 4,937,554 A | 6/1990 | Herman | 6,018,284 A | 1/2000 | Rival et al. | |
| 4,965,909 A | 10/1990 | McCullough et al. | 6,037,729 A | 3/2000 | Woods et al. | |
| 4,975,798 A | 12/1990 | Edwards et al. | 6,052,884 A | 4/2000 | Steckler et al. | |
| 5,020,406 A | 6/1991 | Sasaki et al. | 6,064,629 A * | 5/2000 | Stringer et al. ............ 367/128 | |
| 5,025,175 A | 6/1991 | Dubois, III | 6,095,092 A | 8/2000 | Chou | |
| 5,046,426 A | 9/1991 | Julien et al. | 6,119,984 A | 9/2000 | Devine | |
| 5,052,255 A | 10/1991 | Gaines | 6,133,818 A | 10/2000 | Hsieh et al. | |
| 5,074,047 A | 12/1991 | King | 6,141,192 A | 10/2000 | Garzon | |
| 5,081,406 A * | 1/1992 | Hughes et al. ............ 318/478 | 6,148,504 A | 11/2000 | Schmidt et al. | |
| 5,082,316 A | 1/1992 | Wardlaw | 6,150,826 A * | 11/2000 | Hokodate et al. ........... 324/662 | |
| 5,083,973 A | 1/1992 | Townsend | 6,244,149 B1 | 6/2001 | Ceroll et al. | |
| 5,086,890 A | 2/1992 | Turczyn et al. | 6,257,061 B1 * | 7/2001 | Nonoyama et al. ...... 73/514.32 | |
| 5,094,000 A | 3/1992 | Becht et al. | 6,352,137 B1 | 3/2002 | Stegall et al. | |
| 5,119,555 A | 6/1992 | Johnson | 6,366,099 B1 * | 4/2002 | Reddi ........................ 324/678 | |
| 5,122,091 A | 6/1992 | Townsend | 6,376,939 B1 * | 4/2002 | Suzuki et al. ............... 307/326 | |
| 5,184,534 A | 2/1993 | Lee | 6,404,098 B1 | 6/2002 | Kayama et al. | |
| 5,198,702 A | 3/1993 | McCullough et al. | 6,418,829 B1 | 7/2002 | Pilchowski | |
| 5,199,343 A | 4/1993 | OBanion | 6,420,814 B1 | 7/2002 | Bobbio | |
| 5,201,684 A | 4/1993 | DeBois, III | 6,427,570 B1 | 8/2002 | Miller et al. | |
| 5,207,253 A | 5/1993 | Hoshino et al. | 6,430,007 B1 | 8/2002 | Jabbari | |
| 5,212,621 A | 5/1993 | Panter | 6,431,425 B1 | 8/2002 | Moorman et al. | |
| 5,218,189 A | 6/1993 | Hutchison | 6,450,077 B1 | 9/2002 | Ceroll et al. | |
| 5,231,359 A | 7/1993 | Masuda et al. | 6,453,786 B1 | 9/2002 | Ceroll et al. | |
| 5,239,978 A | 8/1993 | Plangetis | 6,460,442 B2 | 10/2002 | Talesky et al. | |
| 5,245,879 A | 9/1993 | McKeon | 6,471,106 B1 | 10/2002 | Reining | |
| 5,257,570 A | 11/1993 | Shiotani et al. | 6,479,958 B1 | 11/2002 | Thompson et al. | |
| 5,265,510 A | 11/1993 | Hoyer-Ellefsen | D466,913 S | 12/2002 | Ceroll et al. | |
| 5,272,946 A | 12/1993 | McCullough et al. | 6,492,802 B1 * | 12/2002 | Bielski ..................... 324/158.1 | |
| 5,276,431 A | 1/1994 | Piccoli et al. | D469,354 S | 1/2003 | Curtsinger | |
| 5,285,708 A | 2/1994 | Bosten et al. | 6,536,536 B1 | 3/2003 | Gass et al. | |
| 5,320,382 A | 6/1994 | Goldstein et al. | 6,543,324 B2 | 4/2003 | Dils | |
| 5,321,230 A | 6/1994 | Shanklin et al. | 6,546,835 B2 | 4/2003 | Wang | |
| 5,331,875 A | 7/1994 | Mayfield | 6,575,067 B2 | 6/2003 | Parks et al. | |
| 5,341,133 A * | 8/1994 | Savoy et al. ............... 341/22 | 6,578,856 B2 | 6/2003 | Kahle | |
| 5,377,554 A | 1/1995 | Reulein et al. | 6,595,096 B2 | 7/2003 | Ceroll et al. | |
| 5,377,571 A | 1/1995 | Josephs | D478,917 S | 8/2003 | Ceroll et al. | |
| 5,392,678 A | 2/1995 | Sasaki et al. | 6,601,493 B1 | 8/2003 | Crofutt | |
| 5,401,928 A | 3/1995 | Kelley | 6,607,015 B1 | 8/2003 | Chen | |
| 5,411,221 A | 5/1995 | Collins et al. | D479,538 S | 9/2003 | Welsh et al. | |
| 5,451,750 A | 9/1995 | An | 6,617,720 B1 | 9/2003 | Egan, III et al. | |
| 5,471,888 A | 12/1995 | McCormick | 6,619,348 B2 | 9/2003 | Wang | |
| 5,480,009 A | 1/1996 | Wieland et al. | 6,640,683 B2 | 11/2003 | Lee | |
| 5,510,685 A | 4/1996 | Grasselli | 6,644,157 B2 | 11/2003 | Huang | |
| 5,534,836 A | 7/1996 | Schenkel et al. | 6,647,847 B2 | 11/2003 | Hewitt et al. | |
| 5,592,353 A | 1/1997 | Shinohara et al. | 6,659,233 B2 | 12/2003 | DeVlieg | |
| 5,602,734 A * | 2/1997 | Kithil ........................ 701/45 | 6,736,042 B2 | 5/2004 | Behne et al. | |
| 5,606,889 A | 3/1997 | Bielinski et al. | 6,757,602 B2 * | 6/2004 | Breed et al. ................. 701/45 | |
| 5,659,454 A | 8/1997 | Vermesse | 6,826,988 B2 | 12/2004 | Gass et al. | |
| 5,667,152 A | 9/1997 | Mooring | 6,857,345 B2 | 2/2005 | Gass et al. | |
| 5,671,633 A | 9/1997 | Wagner | 2001/0032534 A1 | 10/2001 | Cerroll et al. | |
| 5,695,306 A | 12/1997 | Nygren, Jr. | 2002/0017175 A1 | 2/2002 | Gass et al. | |
| 5,700,165 A | 12/1997 | Harris et al. | 2002/0017176 A1 | 2/2002 | Gass et al. | |
| 5,724,875 A | 3/1998 | Meredith et al. | 2002/0017178 A1 | 2/2002 | Gass et al. | |
| 5,730,165 A | 3/1998 | Philipp | 2002/0017179 A1 | 2/2002 | Gass et al. | |
| 5,755,148 A | 5/1998 | Stumpf et al. | 2002/0017180 A1 | 2/2002 | Gass et al. | |
| 5,771,742 A | 6/1998 | Bokaie et al. | 2002/0017181 A1 | 2/2002 | Gass et al. | |
| 5,782,001 A | 7/1998 | Gray | 2002/0017182 A1 | 2/2002 | Gass et al. | |
| 5,787,779 A | 8/1998 | Garuglieri | 2002/0017183 A1 | 2/2002 | Gass et al. | |
| 5,791,057 A | 8/1998 | Nakamura et al. | 2002/0017184 A1 | 2/2002 | Gass et al. | |
| 5,791,223 A | 8/1998 | Lanzer | 2002/0017336 A1 | 2/2002 | Gass et al. | |
| 5,791,224 A | 8/1998 | Suzuki et al. | 2002/0020261 A1 | 2/2002 | Gass et al. | |
| 5,819,619 A | 10/1998 | Miller et al. | 2002/0020262 A1 | 2/2002 | Gass et al. | |
| 5,852,951 A | 12/1998 | Santi | 2002/0020263 A1 | 2/2002 | Gass et al. | |
| 5,861,809 A | 1/1999 | Eckstein et al. | 2002/0020265 A1 | 2/2002 | Gass et al. | |
| 5,880,954 A * | 3/1999 | Thomson et al. ........... 700/79 | 2002/0020271 A1 | 2/2002 | Gass et al. | |
| 5,921,367 A * | 7/1999 | Kashioka et al. .......... 192/130 | 2002/0056348 A1 | 5/2002 | Gass et al. | |

| | | |
|---|---|---|
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0109036 A1 | 8/2002 | Denen et al. |
| 2003/0005588 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0056853 A1 | 3/2003 | Gass et al. |
| 2003/0074873 A1 | 4/2003 | Freiberg et al. |
| 2003/0089212 A1 | 5/2003 | Parks et al. |
| 2003/0109798 A1 | 6/2003 | Kermani |
| 2004/0104085 A1 | 6/2004 | Lang et al. |
| 2004/0226424 A1 | 11/2004 | OBanion et al. |
| 2004/0226800 A1 | 11/2004 | Pierga et al. |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |
| WO | WO 01/26064 A2 | 4/2001 |

* cited by examiner

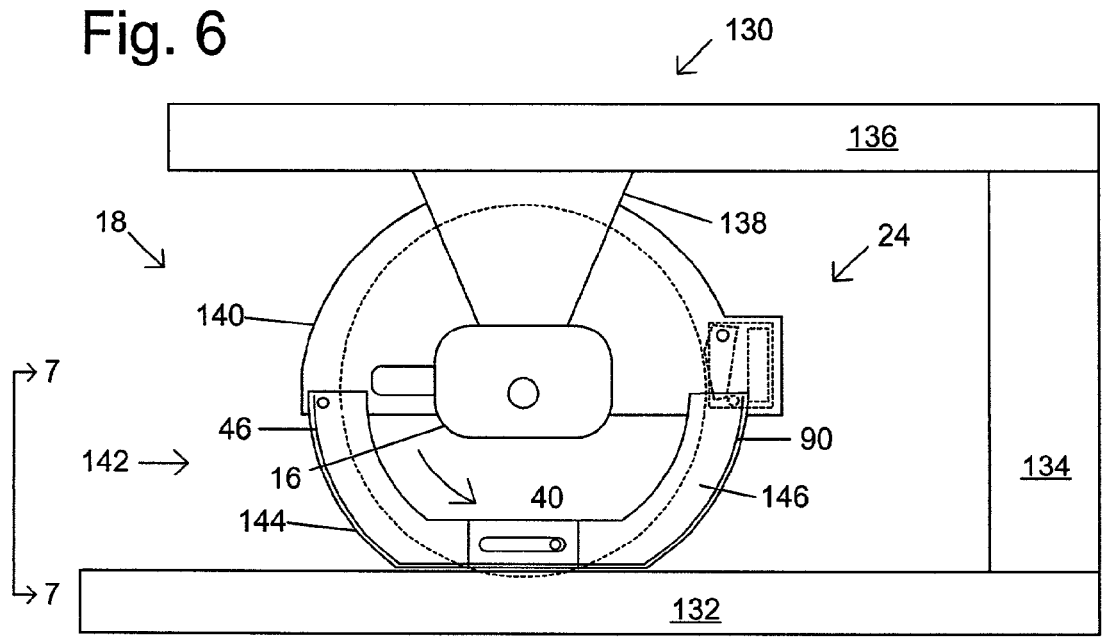

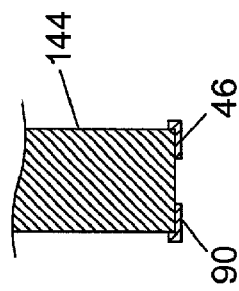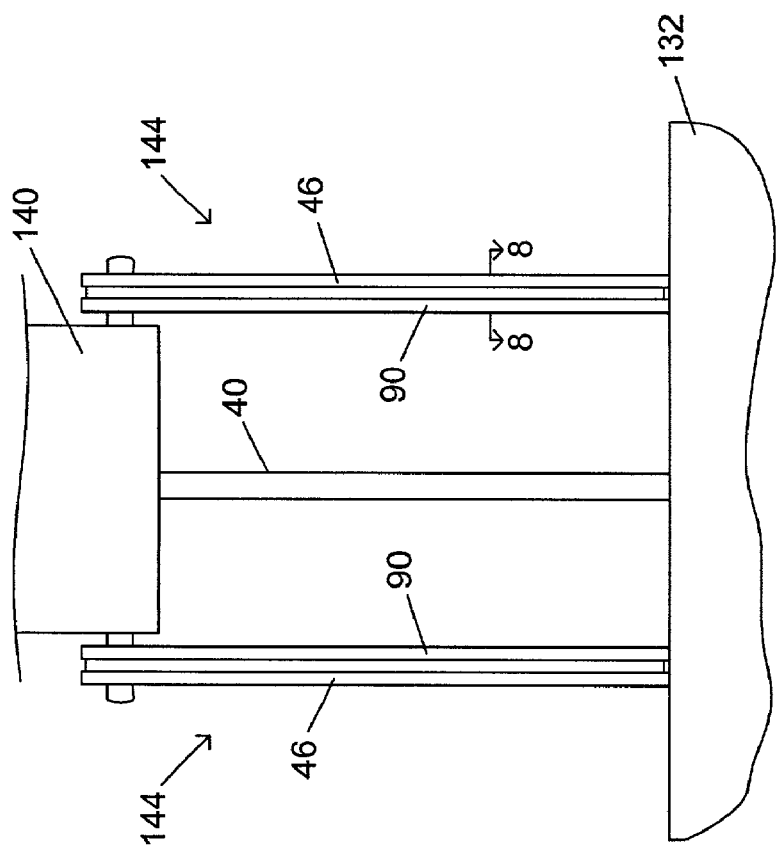

CONTACT DETECTION SYSTEM FOR POWER EQUIPMENT

CROSS-REFERENCE TO RELATED APPLICATIONS

This application is a continuation-in-part of the following U.S. Patent Applications, all of which are hereby incorporated by reference: Ser. No. 09/676,190, filed Sep. 29, 2000, Ser. No. 09/929,221, filed Aug. 13, 2001, Ser. No. 09/929,226, filed Aug. 13, 2001, Ser. No. 09/929,227, filed Aug. 13, 2001, Ser. No. 09/929,234, filed Aug. 13, 2001, Ser. No. 09/929,235, filed Aug. 13, 2001, Ser. No. 09/929,236, filed Aug. 13, 2001, Ser. No. 09/929,237, filed Aug. 13, 2001, Ser. No. 09/929,238, filed Aug. 13, 2001, Ser. No. 09/929,240, filed Aug. 13, 2001, Ser. No. 09/929,241, filed Aug. 13, 2001, Ser. No. 09/929,242, filed Aug. 13, 2001, Ser. No. 09/929,244, filed Aug. 13, 2001, Ser. No. 09/929,425, filed Aug. 13, 2001, and Ser. No. 09/929,426, filed Aug. 13, 2001.

This application claims the benefit of and priority from the following U.S. Provisional Patent Application, which is hereby incorporated by reference: Ser. No. 60/270,011, filed Feb. 20, 2001.

FIELD OF THE INVENTION

The present invention relates to safety systems and more particularly to high-speed safety systems for use on power equipment

BACKGROUND AND SUMMARY OF THE INVENTION

Beginning with the industrial revolution and continuing to the present, mechanized equipment has allowed workers to produce goods with greater speed and less effort than possible with manually powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. However, none of these existing systems have operated with sufficient speed and/or reliability to prevent serious injury with many types of commonly used power tools. Although proximity-type sensors can be used with some equipment to increase the time available to stop the moving pieces, in many cases the user's hands must be brought into relatively close proximity to the cutting element in the normal course of operation. For example, many types of woodworking equipment require that the user's hands pass relatively close to the cutting tools. As a result, existing proximity-type sensors, which are relatively imprecise, have not proven effective with this type of equipment. Even where proximity sensors are practical, existing brake systems have not operated quickly enough to prevent serious injury in many cases.

In equipment where proximity-type detection systems have not proven effective, the cutting tool must stop very quickly in the event of user contact to avoid serious injury. By way of example, a user may feed a piece of wood through a table saw at a rate of approximately one foot per second. Assuming an average reaction time of approximately one-tenth of a second, the hand may have moved well over an inch before the user even detects the contact. This distance is more than sufficient to result in the loss of several digits, severing of vital vessels and tendons, or even complete severing of a hand. If a brake is triggered immediately upon contact between the user's body and the saw's blade, the blade must be stopped within approximately one-hundredth of a second to limit the depth of injury to one-eighth of an inch. Standard solenoids or other electromagnetic devices are generally not designed to act in this time scale, particularly where significant force must be generated. For instance, in the case of solenoids or electromagnetic brakes that operate on 60 hz electrical power, it is possible that the power line will be at a phase that has low voltage at the time the brake is triggered and several milliseconds may elapse before the voltage reaches a sufficient level even to begin physical displacement of the brake, much less achieve a complete stoppage of the blade or cutting tool.

BRIEF DESCRIPTION OF THE DRAWINGS

FIG. 6 is a schematic illustration of an exemplary safety system in the context of a radial arm saw.

FIG. 7 is a fragmentary view taken generally along lines 7-7 in FIG. 6.

FIG. 8 is a fragmentary cross-section view taken generally along lines 8-8 in FIG. 7.

DETAILED DESCRIPTION AND BEST MODE OF THE INVENTION

Figure 1:
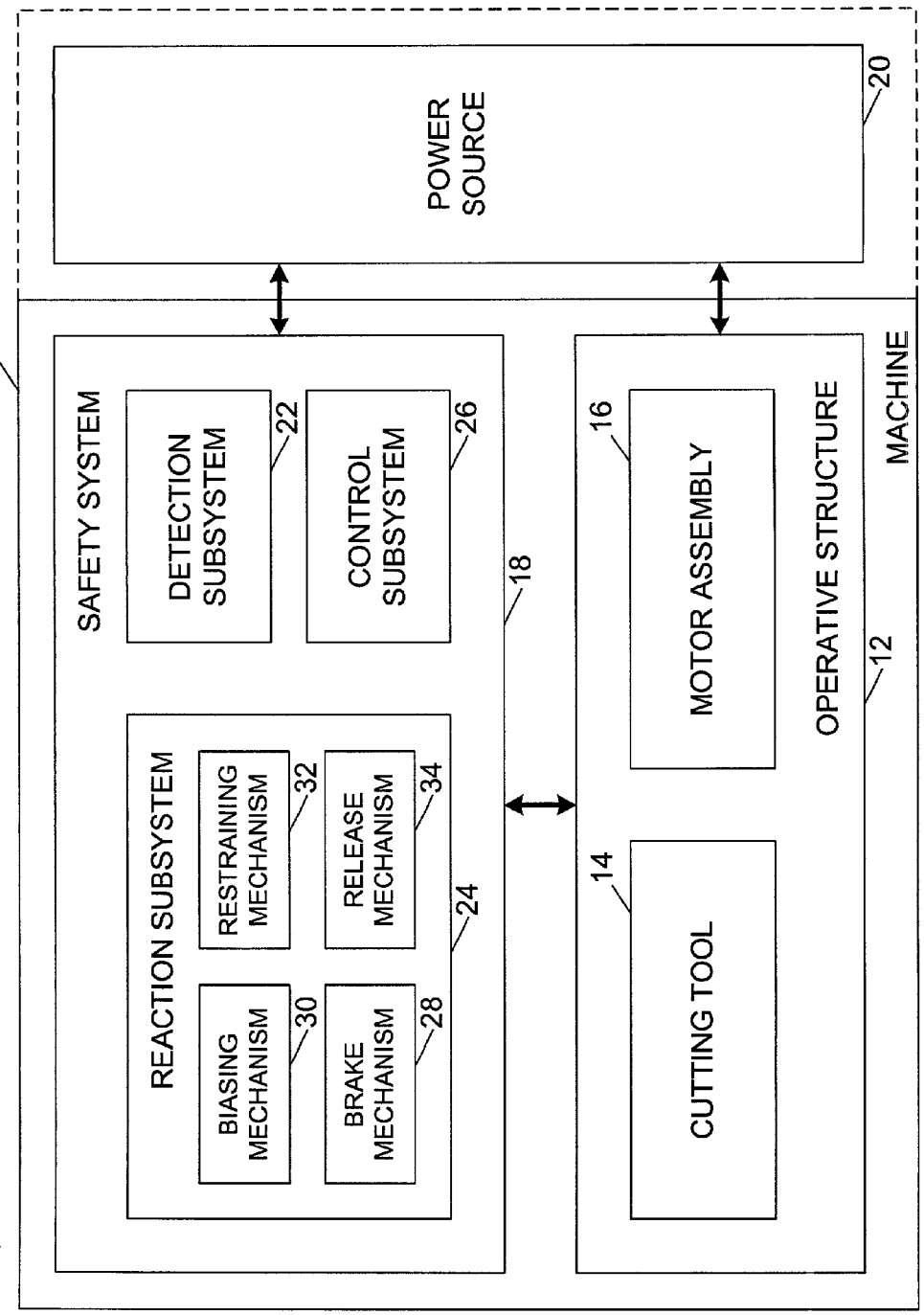
FIG. 1 is a schematic block diagram of a machine with a fast-acting safety system according to the present invention.

A machine according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866 filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by control subsystem 26, the brake mechanism is released from the restraining mechanism by release mechanism 34, whereupon, the brake mechanism quickly engages at least a portion of the operative structure to bring the cutting tool to a stop.

Figure 2:
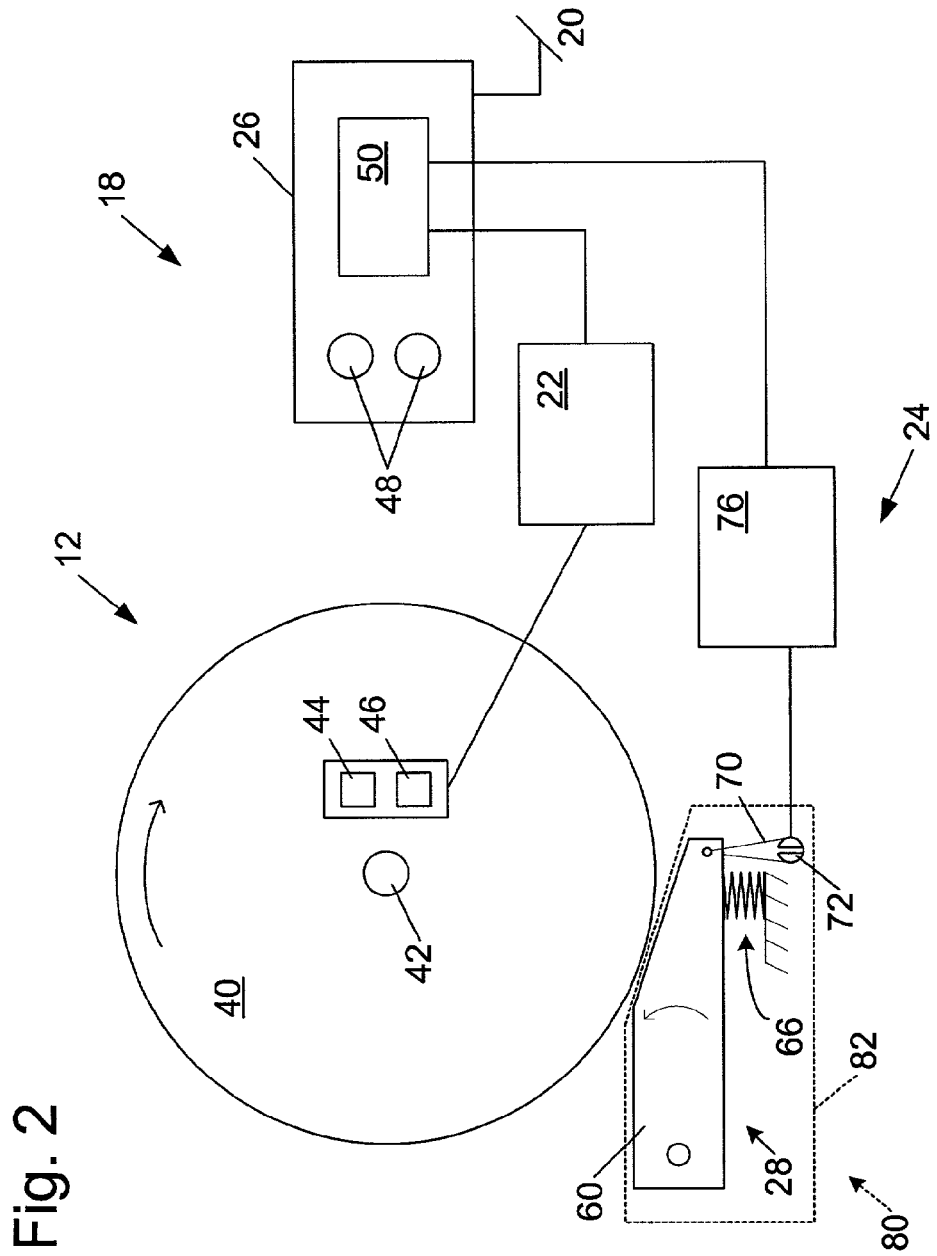
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of machine 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade.

In the exemplary implementation, detection subsystem 22 is adapted to detect the dangerous condition of the user coming into contact with blade 40. The detection subsystem includes a sensor assembly 43 having contact detection electrodes 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No.

60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000 and U.S. patent application Ser. No. 09/929,221, filed Aug. 13, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the implementation shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining member in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism will typically require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

In many of the exemplary embodiments and implementations described above and in the references incorporated herein, detection subsystem 22 relies on the inherent electrical capacitance and/or resistance of the user's body to modify the effective capacitance and/or resistance of the cutting tool or operative structure. The detection subsystems include a sensor assembly 43 configured to apply an electrical signal to a portion of cutting tool 14 and/or operative structure 12, and then detect any change in the signal caused by contact between the user and the portion of the cutting tool or operative structure. However, it may be desirable in some applications to apply a signal directly to the user's body. The signal on the user's body may then induce or change a signal on the cutting tool and/or operative structure. In many situations, such an arrangement may provide increased sensitivity and reliability in detecting contact between the user's body and the blade.

Figure 3:
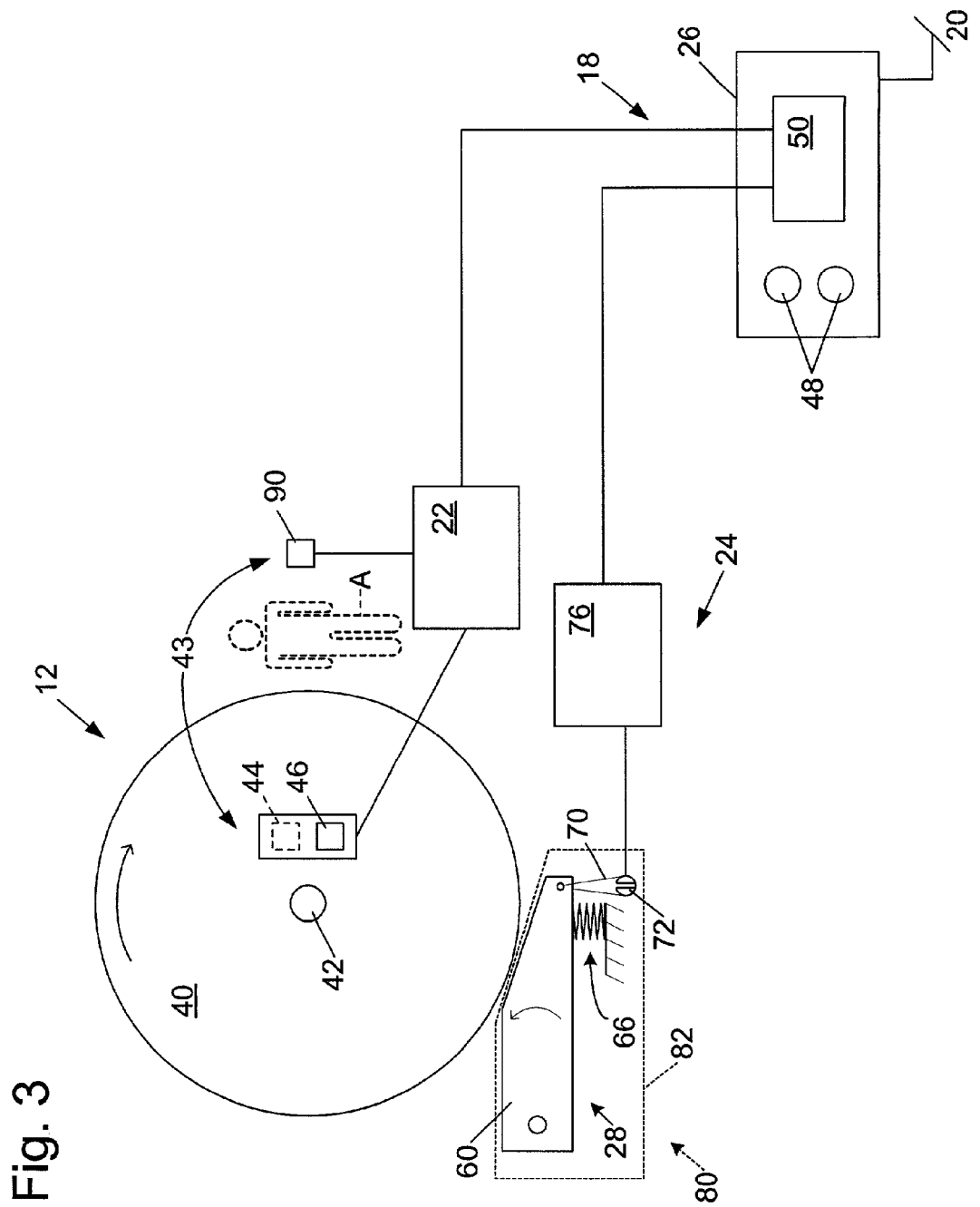
FIG. 3 is a schematic diagram of an alternative exemplary safety system having an operator electrode adapted to couple an electrical signal onto a user's body.

For example, FIG. 3 illustrates one alternative embodiment in which sensor assembly 43 includes at least one drive electrode 44 adapted to apply a first electrical signal to blade 40, and at least one sense electrode 46 adapted to detect an electrical signal on the blade. The sensor assembly also includes at least one operator electrode 90 adapted to electrically couple to the body of a user A. When the user's body contacts the blade, a second electrical signal is coupled onto the blade and combines with the first electrical signal to produce a different electrical signal detectable by sense electrode 46. Alternatively, drive electrode 44 may be omitted, and sense electrode 46 may be configured to detect the second electrical signal when the user's body contacts the blade. As a further alternative, operator electrode 90 may be configured to act as a sense electrode to detect the first electrical signal via the user's body if the user's body contacts the blade. Detection subsystem 22 may include any suitable mechanism for producing and detecting the electrical signals, such as the exemplary circuitry described in U.S. Provisional Patent Application Ser. No. 60/225,200, filed Aug. 14, 2000, U.S. patent application Ser. No. 09/929,426, filed Aug. 13, 2001, and the other references incorporated herein.

It will be appreciated that the first and second electrical signals may be any of a variety of different signals depending on the particular application. In one embodiment for example, drive electrode 44 induces onto blade 40 a sine wave or similar signal whose amplitude oscillates about a ground potential, while operator electrode 90 is held at the ground potential (i.e., a ground signal). When the user's body contacts the blade, the blade is coupled to the ground potential through the impedance of the user's body. As a result, the peak-to-peak amplitude of the oscillating signal on the blade is decreased further than if the user's body is not held at the ground potential. Detection subsystem 22 monitors the peak-to-peak amplitude on the blade via sense electrode 46, and sends an activation signal to reaction subsystem 24 if predetermined conditions are met (e.g., percentage change in amplitude, rapid change in amplitude, etc.).

In another embodiment, detection subsystem 22 is configured to drive the same oscillating signal on the operator electrode as on the drive electrode, except that the signal on the operator electrode is 180-degrees out of phase with the signal on the drive electrode. Thus, when the first signal has a positive amplitude relative to ground, the second signal has a negative amplitude, and vice-versa. In other words, the signal on the operator electrode has a reverse polarity to the signal on the drive electrode. As will be appreciated by those of skill in the art, when the signal from the operator electrode is coupled to the blade, the peak-to-peak amplitude of the signal detected by the sense electrode will be even further reduced because each of the first and second electrical signals will tend to cancel the other. Optionally, the peak-to-peak amplitude of the second electrical signal may be either less than or greater than the peak-to-peak amplitude of the first electrical signal to cause the combined signal detected by the sense electrode to approximate a non-oscillating signal at ground potential. It will be appreciated that the peak-to-peak amplitude of the second electrical signal should be of sufficient magnitude to ensure that the peak-to-peak amplitude of the signal detected by the sense electrode changes when the user's body contacts the blade.

In the exemplary embodiments described above, detection subsystem 22 is configured to monitor the change in the peak-to-peak amplitude of the signal detected by the sense electrode. However, other detection methods also may be employed within the scope of the invention. For example, the detection subsystem may be configured to sample the signal on the blade at intervals corresponding to the frequency of the first electrical signal, and to activate the reaction subsystem if the polarity of the detected signal is reversed. Typically, the frequency of the electrical signals as well as the sampling rate are sufficiently high to ensure that at least one, and preferably several, samples may be taken while a single tooth of blade 40 is in contact with the user's body. This enables the detection subsystem to activate the reaction subsystem in response to the first tooth that contacts the user's body. The length of time each tooth is in contact with the user's body will vary with tooth size and rotation speed, but is typically in the range of 50-200 μsec.

Figure 4:
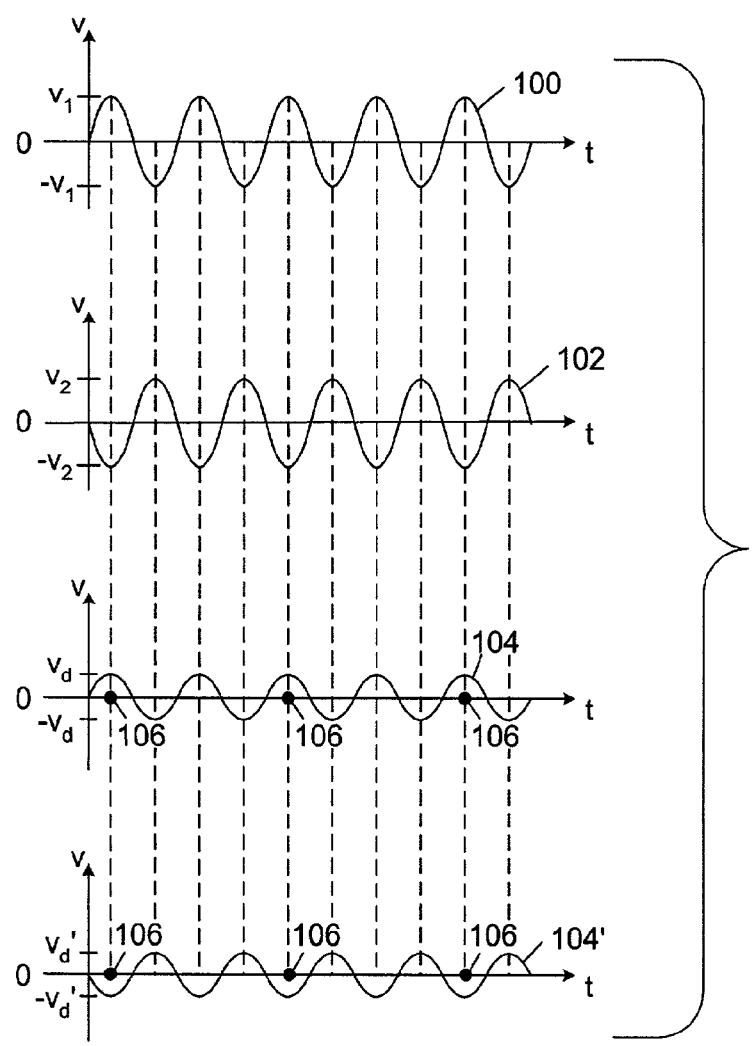
FIG. 4 schematically illustrates exemplary electrical signals produced and detected by a safety system according to the present invention.

FIG. 4 illustrates exemplary electrical signals for such an alternative embodiment. The first electrical signal, indicated at 100, oscillates about ground between voltages $V_1$ and $-V_1$. The second electrical signal, indicated at 102, oscillates between the voltages $V_2$ and $-V_2$, at the same frequency as the first electrical signal but 180-degrees out of phase. The amplitudes $V_2$ and $-V_2$ of the second electrical signal are selected, relative to $V_1$ and $-V_1$, so that the signal detected by the sense electrode changes phase if the user's body comes into contact with the blade. When the user's body is not in contact with the blade, the signal detected by the sense electrode, indicated at 104, oscillates about the ground potential substantially in phase with the first electrical signal. The detected signal will oscillate between voltages $V_d$ and $-V_d$, based on the voltages of the first electrical signal $V_1$, $-V_1$, and the impedance of the coupling between the drive electrode and the blade.

However, when the users body contacts the blade, the second electrical, signal is coupled to the blade through the user's body. The resulting signal detected by the sense electrode, indicated at 104', will oscillate between $V_d'$ and $-V_d'$ substantially in phase with the second electrical signal, i.e., approximately 180-degrees out of phase with the first electrical signal. The voltage amplitudes $V_d'$ and $-V_d'$ will vary depending on the relative amplitudes of the first and second electrical signals as well as the impedances of the couplings of the drive electrode and operator electrode to the blade.

Detection subsystem 22 samples the signal on blade 40 via the sense electrode at intervals 106 corresponding to the maxima of the first electrical signal. Thus, when the user's body is not in contact with the blade, detected signal 104 will be positive at each sample point. Conversely, when the user's body is in contact with the blade, detected signal 104' will be negative at each sample point. If the detected signal is negative at the sample points, i.e., 180-degrees out of phase with the first electrical signal, reaction subsystem 24 is activated to stop the movement of the blade. Alternatively, the detection subsystem may be configured to sample the signal on the blade at intervals corresponding to the minima of the first electrical signal. In such case the detected signal will be positive at the sample points if the user's body comes into contact with the blade.

In an alternative embodiment in which drive electrode 44 is omitted, detection subsystem 22 may be configured to sample at points corresponding to both the maxima and minima of the second electrical signal. This would allow the detection system to filter out 60 Hz noise and other extraneous signals.

Figure 5:
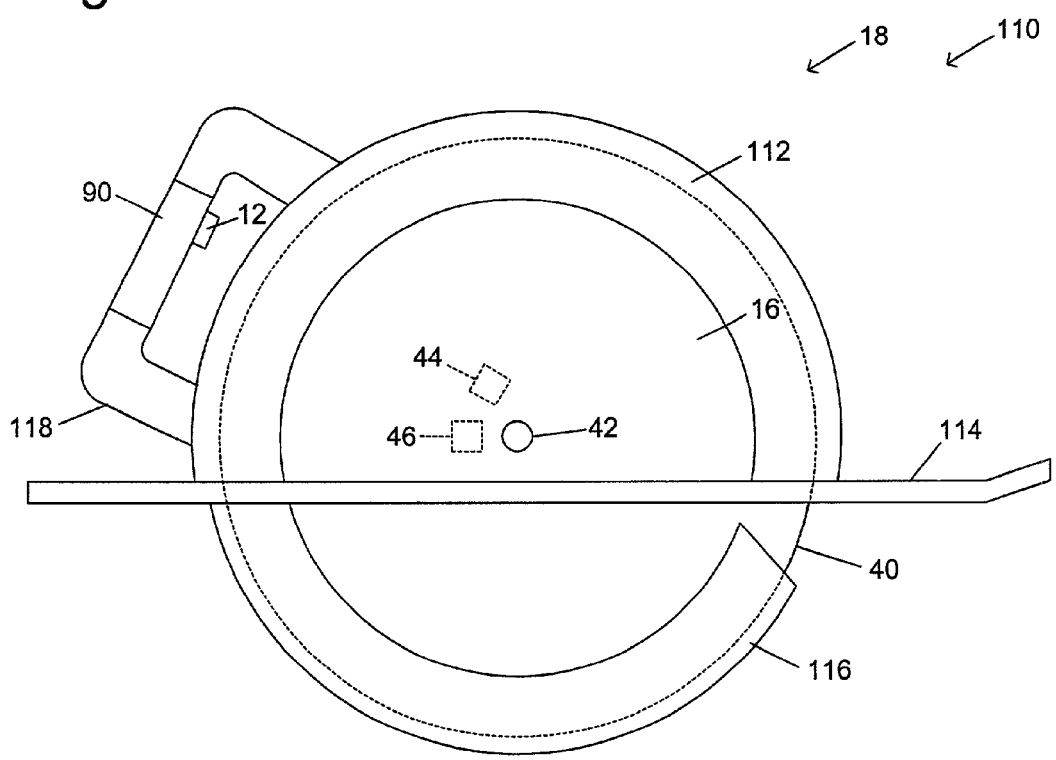
FIG. 5 is a schematic illustration of an exemplary safety system in the context of a handheld circular saw.

It will be appreciated that operator electrode 90 may be configured in any of a variety of different ways to couple the second electrical signal to the user's body. Typically, the operator electrode is configured to inherently couple the second electrical signal to the user's body whenever the user operates machine 10. For example, FIG. 5 illustrates an exemplary detection subsystem in the context of a circular saw 110. Typically, circular saw 110 includes a housing 112 that contains a motor assembly 16, a guide plate 114, and a retractable blade guard 116. Blade 40 is coupled to the motor assembly by arbor 42. Safety system 18 may be implemented on circular saw 110 according to any of the embodiments and configurations described above and in the references incorporated herein. For example, safety system 18 may include a brake pawl (not shown) configured to stop blade 40 if the user's body contacts the blade. Detection subsystem 22 includes drive electrode 44 and sense electrode 46 positioned adjacent the blade. Optionally, drive electrode 44 may be omitted as described above.

Circular saw 110 also includes a handle portion 118 having an operating trigger 120. The trigger is connected to apply power to motor assembly 16 to drive the blade. A user operates circular saw 110 by grasping handle portion 118 and squeezing trigger 120 to start the blade rotation. When the trigger is released, the blade slows to a stop. Operator electrode 90 is in the form of an electrically conductive cover or layer disposed on handle portion 118. Typically, the operator electrode covers substantially all of handle portion 118 to ensure the user will be in contact with the electrode whenever operating the saw. Alternatively, the operator electrode may be disposed on only a portion of the handle portion, or may be disposed on trigger 120 instead of, or in addition to, the handle portion. Optionally, the operator electrode may be covered by a relatively thin insulating layer to prevent any extraneous direct currents from coupling to the user's body. The second electrical signal, which is oscillating, will nevertheless capacitively couple to the user's body.

In any event, the second electrical signal is conductively and/or capacitively coupled to the user's body via operator electrode 90. If a portion of the user's body contacts the blade, the second electrical signal is then coupled to the blade through the user's body. The second electrical signal, either alone or in combination with a first electrical signal, is detected via sense electrode 46, at which point safety system 18 triggers the brake pawl to stop the blade.

In addition to the handheld circular saw depicted in FIG. 5, it will be appreciated that the exemplary embodiment of safety system 18 may adapted for use on any type of power saw having a handle or other portion that must be gripped by the user during operation. For example, exemplary operator electrode 90 may be disposed on the handles of a miter saw, radial arm saw, handheld router, handheld planer, etc.

In another embodiment of the invention, sense electrode 46 and operator electrode 90 may be positioned closely adjacent the blade so that the user's body must come into contact with the electrodes before coming into contact with the blade. If the user's body contacts the electrodes, the second electrical signal is coupled from the operator electrode to the sense electrode via the user's body. The drive electrode may be omitted. In such an embodiment, safety system 18 may be configured to stop the motion of the blade before the user's body actually makes contact with the blade, thereby preventing the user from receiving even a small cut. Thus, safety system 18 would be configured to detect any dangerous proximity of the user's body to the blade and react to prevent serious injury to the user.

The placement of the sense and operator electrodes will vary depending on the type of machine 10. As one example of the many different configurations that are possible, FIGS. 6-8 illustrate an embodiment of safety system 18 in the context of a radial arm saw 130. Typically, radial arm saw 130 includes a horizontal base 132, a vertical support column 134 extending upward from base 132, and a guide arm 136 which extends from column 134 vertically spaced above base 132. A carriage 138 is slidably coupled to the underside of guide arm 136. The bottom end of carriage 138 is connected to a saw housing 140 and motor assembly 16, allowing blade 40 to be pulled across the base to cut workpieces (not shown) supported on the base. A guard member 142, such as those known in the art, is positioned on one or both sides of blade 40. Guard member 142 is disposed relative to the blade so that any portion of the user's body approaching the blade will first strike against the guard member. Reaction subsystem 24 is adapted to stop the rotation of blade 40 in the event the user's body contacts guard member 142. Alternatively or additionally, the reaction subsystem may be configured to stop and/or reverse the movement of carriage 138, as is discussed in one or more of the references incorporated herein.

Typically, guard member 142 is movably coupled to housing 140 so as to maintain its blade-shielding position as the blade passes over the workpiece. In the exemplary embodiment, the guard member includes a front portion 144 and a rear portion 146. The front portion is pivotally and slidably coupled to the rear portion so that each portion slides over the workpiece as the blade is moved across the workpiece. The guard member is preferably constructed of an electrically insulating material such as plastic, ceramic, etc. Sense electrode 46 and operator electrode 90 are formed as electrically conductive coatings along the perimetrical edges of the guard. Alternatively, the electrodes may be formed separately as conducting plates and then mounted on the front and rear portions. The electrodes may be connected to the detection subsystem (not shown) by any suitable means.

As best seen in FIG. 7, one of the electrodes is disposed along the side of the guard member adjacent the blade, while the other electrode is disposed along the side of the guard member opposite the blade. The electrodes are relatively closely spaced apart to ensure the user's body contacts both electrodes when proximate the blade. For clarity, only the front portions of guard member 142 are shown in FIG. 7. As illustrated in FIG. 6 however, the relative positioning of the electrodes on the rear portion of the guard member may be reversed from the positioning on the front portion to ensure the two electrodes do not come into contact at the intersection of the front and rear portions. As shown in FIG. 8, the size and arrangement of the electrodes are selected to minimize capacitive coupling between the electrodes.

The particular placement of the sense and operator electrodes illustrated in FIGS. 6-8 allows a user to grasp the workpiece closely adjacent the guard member without accidentally triggering reaction subsystem 24. Indeed, the reaction subsystem will not be triggered even if the user inadvertently contacts an outer side of the guard member since the user will only contact one electrode. Alternatively, the electrodes may be shaped and arranged in any of a wide variety of other ways within the scope of the invention. In any event, the electrodes are arranged to contact the user's body before the user's body can contact the blade.

Figure 9:
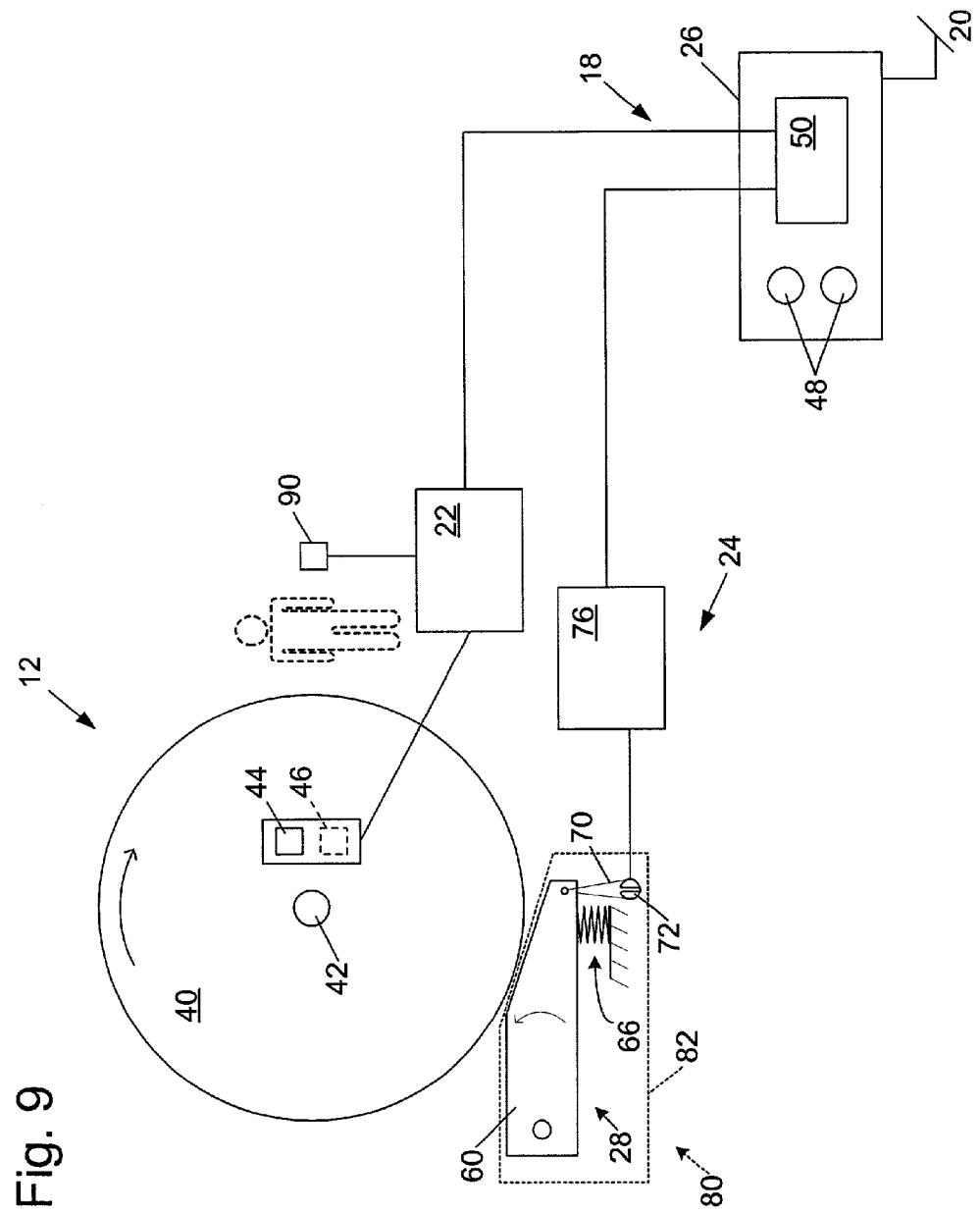
FIG. 9 is a schematic diagram of an alternative exemplary safety system having an operator electrode adapted to detect an electrical signal coupled onto a user's body by contact with the blade.

Turning attention now to FIG. 9, a further alternative embodiment is illustrated in which contact between the user's body and the blade is detected at the operator electrode rather than at the sense electrode. In this embodiment, drive electrode 44 couples a first electrical signal onto blade 40 as described above. Thus, when the user's body contacts the blade, the first electrical signal is coupled to the user's body. Alternatively, the drive electrode may be configured to couple the first electrical signal onto a guard member or similar structure proximate the blade. Operator electrode 90 is configured as a sense electrode to detect the first electrical signal via the user's body. Detection subsystem 22 may be configured to monitor the peak-to-peak amplitude of the signal detected at the operator electrode, or may be synchronized with the first electrical signal to monitor for a signal having the same phase or frequency, etc. Alternatively, the detection subsystem may be configured to detect a signal via the user's body by any other suitable method. In any event, safety system only detects a dangerous condition if the first electrical signal is detected at the operator electrode through the user's body. Sense electrode 46 may be omitted. Alternatively, the sense electrode may be used as a fault monitor to verify that the first electrical signal is properly coupled to the blade. In which case, safety system 18 may be configured to report a fault and prevent operation of machine 10 if sense electrode 46 does not detect the expected signal.

As described above, safety system 18 is configured to apply a signal to a user's body, and then detect the signal on blade 40 or some other structure adjacent the blade in the event of contact with the user's body. Alternatively, safety system 18 may be configured to apply a signal to the blade or other structure, and then detect the signal via the user's body. In the event that contact is detected, the safety system reacts to prevent serious injury to the user. It will be appreciated that the present invention may be used in a variety of combinations and configurations including those described in the references incorporated herein. Additional embodiments and configurations of machine 10 and safety system 18 suitable for use in connection with the present invention are described in the following references, the disclosures of which are herein incorporated by reference: PCT Patent Application Serial No. PCT/US00/26812, filed Sep. 29, 2000; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method for detecting accidental contact between a person and a dangerous portion of a woodworking machine, the method comprising:
   providing a first electrode electrically coupled to the person;
   providing a second electrode electrically coupled to the dangerous portion;
   transmitting a signal by one of the first or second electrodes;
   receiving the transmitted signal by the other of the first or second electrodes; and
   performing a step of sampling the signal a plurality of times to determine if the signal has at least one predetermined characteristic indicative of contact between a person and the dangerous portion.

2. A method for detecting accidental contact between a person and a dangerous portion of a woodworking machine, the method comprising:
   providing a first electrode electrically coupled to the person;
   providing a second electrode electrically coupled to the dangerous portion;
   transmitting a signal by one of the first or second electrodes;
   detecting whether the transmitted signal is received by the other of the first or second electrodes; and if so,
   sampling the signal a plurality of times within 200 microseconds to determine if the signal has at least one predetermined characteristic indicative of contact between a person and the dangerous portion.

3. The method of claim 2, where the step of transmitting includes transmitting the signal by the first electrode through the person.

4. The method of claim 2, where the step of transmitting includes transmitting the signal by the second electrode through the dangerous portion.

5. The method of claim 2, where the woodworking machine includes at least one cutting tool, and where the step of providing a second electrode includes providing a second electrode electrically coupled to the at least one cutting tool.

6. The method of claim 2, where the woodworking machine includes at least one guard, and where the step of providing a second electrode includes providing a second electrode electrically coupled to the at least one guard.

7. The method of claim 2, where the step of transmitting includes transmitting an alternating electrical signal.

8. The method of claim 7, where the alternating electrical signal has a particular frequency, and further comprising identifying contact if an electrical signal having the particular frequency is received.

9. The method or claim 2, where the step of transmitting includes transmitting a ground electrical signal.

10. The method of claim 2, where the dangerous portion is a blade with cutting teeth, and where the sampling occurs while a single tooth is in contact with the person.

11. The method of claim 2, where the sampling occurs within 100 microseconds.

12. The method of claim 2, where the sampling occurs in less than 100 microseconds.

13. The method of claim 2, where the predetermined characteristic indicative of contact between a person and the dangerous portion distinguishes such contact from proximity between a person and the dangerous portion.

14. The method of claim 13, where the predetermined characteristic indicative of contact between a person and the dangerous portion involves peak-to-peak amplitude.

15. The method of claim 13, where the predetermined characteristic indicative of contact between a person and the dangerous portion involves phase.

16. The method of claim 13, where the predetermined characteristic indicative of contact between a person and the dangerous portion involves a positive value.

17. The method of claim 13, where the predetermined characteristic indicative of contact between a person and the dangerous portion involves a negative value.

* * * * *

UNITED STATES PATENT AND TRADEMARK OFFICE
CERTIFICATE OF CORRECTION

PATENT NO. : 7,377,199 B2  Page 1 of 1
APPLICATION NO. : 10/053390
DATED : May 27, 2008
INVENTOR(S) : Stephen F. Gass and J. David Fulmer It is certified that error appears in the above-identified patent and that said Letters Patent is hereby corrected as shown below:

Column 12, line 58, delete "or" and insert --of--.

Signed and Sealed this

Twenty-eighth Day of October, 2008

JON W. DUDAS
*Director of the United States Patent and Trademark Office*